United States Patent [19]

Fung

[11] 4,118,669

[45] * Oct. 3, 1978

[54] REMOTE DISCONNECT-RECONNECT TAP FOR CABLE TELEVISION SYSTEMS

[75] Inventor: Paul J. Fung, San Mateo, Calif.

[73] Assignees: Premier Cablevision, Limited, Vancouver; National Cablevision, Limited, Quebec, both of Canada

[*] Notice: The portion of the term of this patent subsequent to Oct. 19, 1993, has been disclaimed.

[21] Appl. No.: 732,571

[22] Filed: Oct. 15, 1976

[51] Int. Cl.² ............................................. H04B 3/04
[52] U.S. Cl. .................................. 325/309; 325/37; 325/31; 358/114
[58] Field of Search .................. 325/31, 37, 64, 308, 325/309, 392, 394, 53; 358/84, 86, 114; 179/1 B, 16 A, 84 VF; 343/225, 228; 340/147 R, 167 R, 171 PF, 147 B, 147 CN; 307/132 R, 132 E

[56] References Cited

U.S. PATENT DOCUMENTS

| | | | |
|---|---|---|---|
| 3,423,521 | 1/1969 | Friesen et al. | 325/309 |
| 3,757,225 | 9/1973 | Ulicki | 325/308 |
| 3,790,700 | 2/1974 | Callais et al. | 325/308 |
| 3,803,491 | 4/1974 | Osborn | 325/308 |
| 3,852,537 | 12/1974 | Vincent | 179/84 VF |

Primary Examiner—Robert L. Griffin
Assistant Examiner—Jin F. Ng
Attorney, Agent, or Firm—Fetherstonhaugh & Co.

[57] ABSTRACT

A remotely controlled disconnect-reconnect tap for a cable television system having a head end feeding a cable distribution system. The tap comprises means for receiving and detecting a plurality of pairs of tones modulated on a carrier and sent over the cable distribution system from the head end, means responsive to a predetermined sequence of said pairs of tones for developing a control signal, and switch means responsive to the control signal which turns off if already on or on if already off to thereby disconnect or reconnect, respectively, a subscriber to the cable distribution system.

5 Claims, 6 Drawing Figures

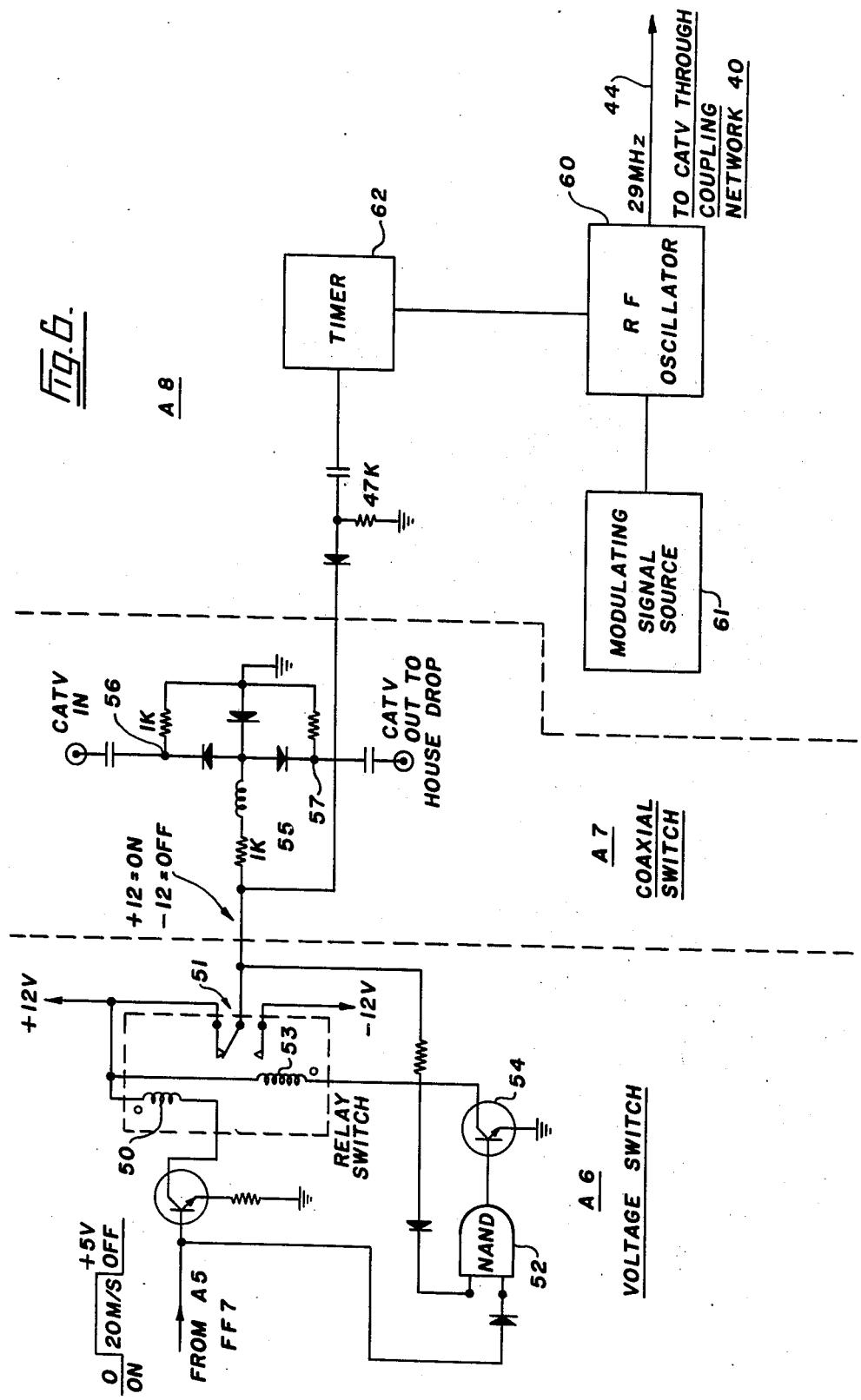

REMOTE DISCONNECT-RECONNECT TAP FOR CABLE TELEVISION SYSTEMS

This is a continuation of Ser. No. 486,218 filed July 5, 1974, now U.S. Pat. No. 3,987,398 issued Oct. 19, 1976.

BACKGROUND OF THE INVENTION

Television receivers in cable television (CATV) subscriber homes are normally connected by a "drop" cable to the distribution cable passing the residence by means of a passive device called a "tapoff" or simply a "tap". This tap is basically an unbalanced splitter which diverts a small amount of the television signals to the connected receiver, leaving the bulk of the signal energy to continue on down the distribution cable. When a CATV system is constructed it has been the practice to install all of the tapoff devices that are necesary to connect 100% of the homes passed. It is unlikely that all of the homes will become subscribers, but eventually it is expected that the majority will take the service. For various reasons, primarily technical, it is expedient to make provision for 100% acceptance.

When a home is connected for the first time, the drop cable is physically and electrically installed between the television receiver and the tap. From time to time workmen have occasion to disconnect or reconnect this "drop" cable to the tap for several reasons. Sometimes it is at the request of the user, at other times upon instructions from the cable business office, such as in the case of a disconnect for non-payment of the monthly fees. A reconnect will be done when payment of arrears is made, or when a new subscriber occupies the same residence. It is generally not the practice to remove the drop cable between the tap and receiver when a disconnect is made. The electrical connection is broken at the tap, and the drop cable is physically left in place.

SUMMARY OF THE INVENTION

Rather than have a workman go out in the field to reconnect a subscriber to a tap, or disconnect a subscriber from the tap, the present invention provides means whereby the connection or disconnection of specific subscribers may be done from the cable company's central office.

Furthermore, the invention may provide a return path (2 way system) to provide the following advantageous features:

1. The ability to advise the central office that a "disconnect" command has been carried out, and therefore 2. Make it possible to audit the CATV system at any given time to determine the "on" or "off" status of every tap with this feature.

Each individual tap is assigned an identification code number in which each digit corresponds to a different pair of tone frequencies. A typical example of such a numbering plan is the one employed by telephone companies in the United States and Canada. Furthermore, the tones used can be identical (though they need not be) to the ones used by the telephone companies for their touch-tone dialing system. Many of the special devices and components used for touch-tone dialing are readily available, and applicable to the system according to the invention.

Assuming a six digit code is assigned to a tap, and that there are 10 different digits possible for each sequence, it is possible to assign 999,999 different numbers, or tap addresses. A five digit code would result in 99,999 addresses, four digits in 9,999 addresses, etc. Each digit (1, 2, 3, 4, 5, 6, 7, 8, 9, 0) in the address code corresponds to a pair of tone frequencies. When six tone pairs are sequentially sent out over the CATV cable from the central office in the right code they will change the "on", (or "off") status of the addressed tap to the opposite condition. Each tap is capable of recognizing its own address code when it is present, and does not respond to any deviation from the code.

If a tone pair is received by the remotely controlled disconnect-reconnect tap which is not in the sequence set for that specific tap, but is received after a correct pair or pairs, the unit will reset to its initial condition after a predetermined period of time. A correct tone pair sequence that results in the tap being turned "off", will trigger a reporting signal. This signal can be delivered back to the central office on a two-way CATV system in the upstream, or sub band as an indication that the "off" command has been carried out. If the command is to turn "on" an "off" tap, no reporting signal is triggered but technically it would be possible. Physical space and economics would be considerations for such a feature. An "on" situation can be verified, to some extent, by going through an "off" command, and getting an acknowledgement indication. The "on" command is given next resulting in no acknowledgement but it can be reasonably assumed to have been carried out. If not the subscriber will inevitably let the central office know.

As the rotatably controlled disconnect-reconnect tap has "active" elements it needs to be powered, and this is conveniently accomplished from the cable which normally carries AC voltages for powering amplifiers on the CATV system. An insurance feature is provided in the event of power failure to the remotely controlled disconnect-reconnect tap. This ensures that the "on" or "off" status of the tap is "held" until power is restored.

To operate the remote control tap, all the central office operator needs to know is the subscriber location identification code and send that coded signal through the cables of the CATV system. The signal received in the remote tap is converted into a plurality of tones, which, occurring in the proper sequence, cause the tap to turn "off" if "on", or "on" if "off". The remotely controlled tap is capable of recognizing and distinguishing its own address (code) out of all the addresses of the subscriber locations.

In its broadest aspects, then, the invention provides a remotely controlled disconnect-reconnect tap for a cable television system having a head end feeding a cable distribution system. The tap comprises means for receiving and detecting a plurality of pairs of tones modulated on a carrier and sent over the cable distribution system from the head end, means responsive to a predetermined sequence of said pairs of tones for developing a control signal, and switch means responsive to the control signal which turns off if already on or on if already off to thereby disconnect or reconnect, respectively, the subscriber to the cable distribution system.

BRIEF DESCRIPTION OF THE DRAWINGS

FIG. 6 is a partly block, partly schematic diagram illustrating in more detail circuits A6, A7 and A8 of FIG. 4.

DESCRIPTION OF THE PREFERRED EMBODIMENTS

Figure 1:
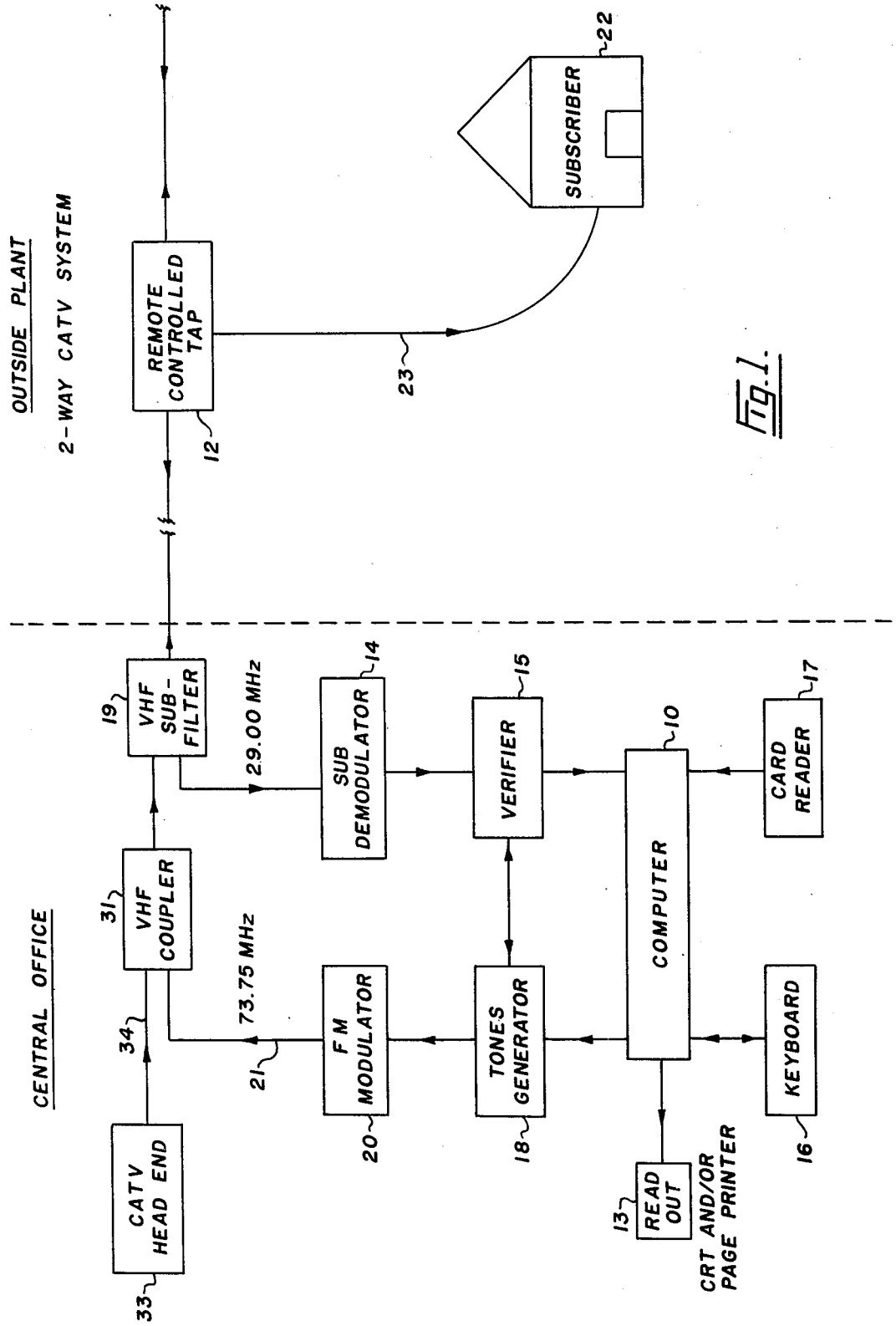
FIG. 1 is a functional system block diagram showing the major equipment at the central office connected to the CATV system.

Referring to FIG. 1, which shows the major equipment at the central office, the heart of the system is a computer 10, such as a general purpose minicomputer. A return signal (to be discussed in more detail later) from the remote controlled tap 12 will be distinguished by the computer which in turn can actuate a read out device 13 which could be a CRT display, or a page printer, or both. The computer 10 is connected to an electronic keyboard or typewriter 16 to provide information such as the customer's address, identification code, and the time and date when his tap was shut off. The keyboard can also give instructions to the computer at the discretion of a manual operator. Periodically, the computer can scan all of the subscriber locations and automatically shut off the taps of those who have not kept their payments up to date, information regarding which may be fed into the computer by a card reader 17, for example. When the payment is received the tap is turned back on again. A sophisticated system may use a card reader computer, programme cassette tapes or punched tapes. The computer 10 also controls the tones generator 18 which feeds pairs of tones in predetermined sequences, depending on the identity of the subscriber, which feed a modulator 20 which is preferably an FM modulator. The FM modulator 20 modulates a carrier of, for example, 73.75 MHz and the resulting modulated signals are sent over line 21 and the CATV system to the remote controlled tap 12 causing the tap to turn "off" if already "on" or "on" if already "off". This determines whether the subscriber 22 can receive signals from the CATV system over the house drop 23.

The return sub frequency, 29.00 mHz, is separated from the CATV signals in the VHF/SUB filter 19. The 1 KHz modulating signal is derived in the sub demodulator 14 and checked in the verifier 15 against the tones generator 18. This ensures that the address sent and the task identification signal relate to the same address. It can be arranged that the tones generator cannot move on to the next address until the verifier confirms that the last address was turned off. The verifier then passes this to the computer for storage and/or read out 13.

Figure 2:
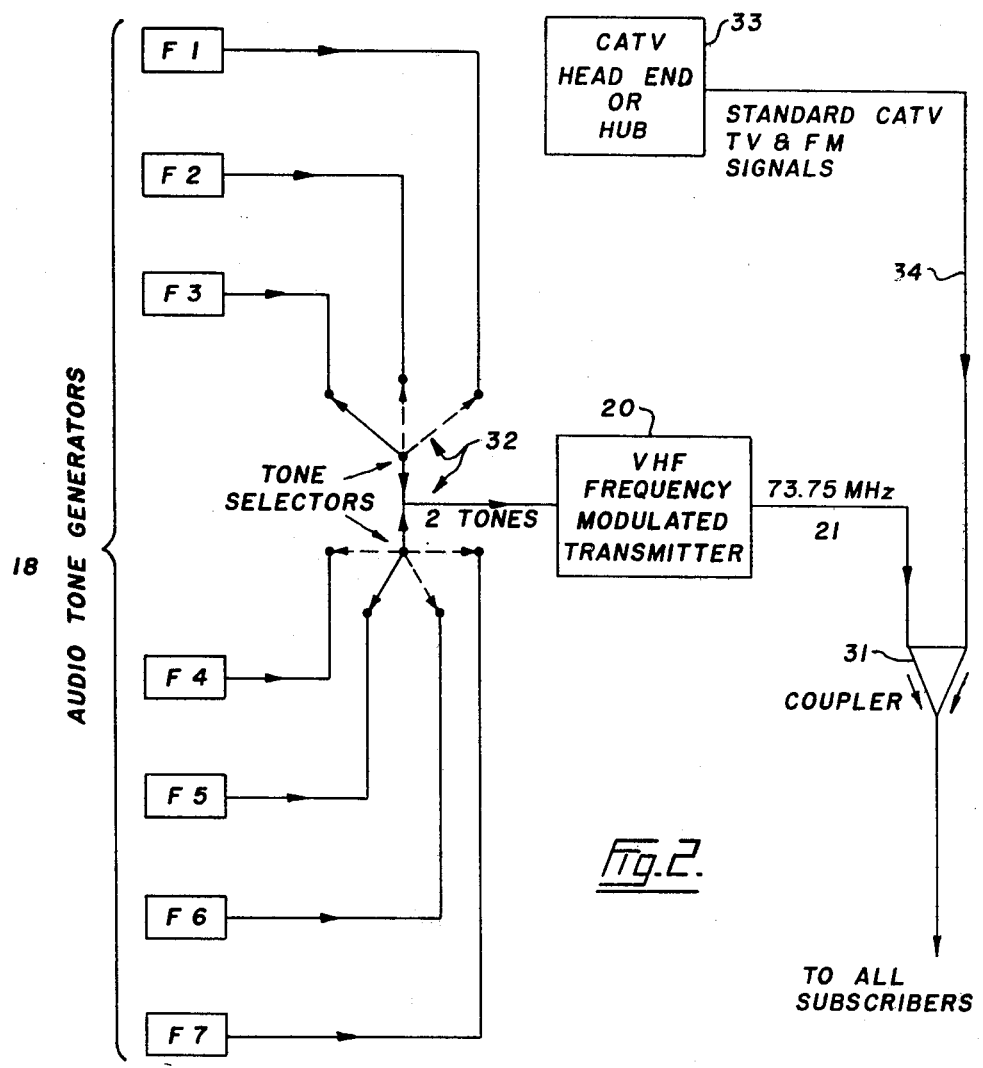
FIG. 2 is a simplified block diagram of coding equipment at the head end.

Referring to FIG. 2, tones generator 18 of FIG. 1 comprises seven audio tone generators F1 to F7 which generate tones $f1$ to $f7$ to frequency modulate a VHF transmitter 20 connected directly to the CATV system at the head end or hub by a coupler 31. The tones are transmitted two at a time, one from a group of three (F1 – F3) and one from a group of four (F1 – F7) and this results in a possible selection of twelve different pairs of tone frequencies, the tone pairs being selected by switching means generally indicated at 32. Ten of the audio tones are assigned to correspond to digits 0 to 9, and two are left in reserve. The coding system can be designed for any number of sequential tone pairs depending on how many different addresses are to be accomodated. In this case, it is assumed that a six digit code will suffice representing 999,999 different combinations.

Coupler 31 also, of course, feeds to the subscribers via the CATV system the standard CATV TV and FM signals fed from the head end equipment indicated by reference numeral 33 over line 34.

The VHF transmitter output carrier can be on any suitable frequency in the 72–76 MHz band as this band is normally unused and available in all CATV systems. For purposes of this description, assume the frequency used is 73.75 MHz. This carrier then appears on the CATV system as an integral part of the signal delivered because it is situated between TV channels 4 and 5.

Figure 4:
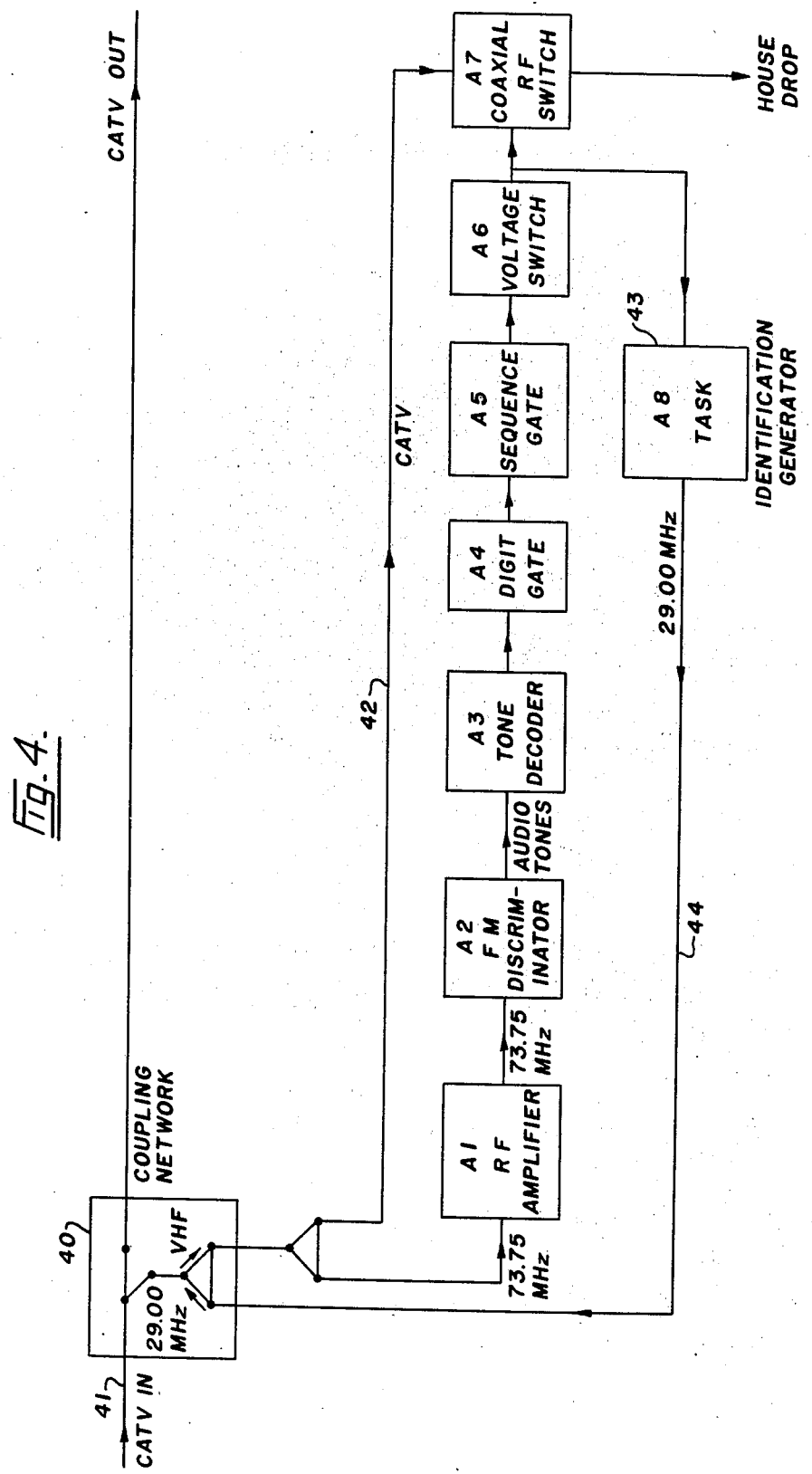
FIG. 4 is a block diagram of a remotely controlled disconnect-reconnect tap according to the invention.

Referring to FIG. 4, the 73.75 MHz signal is received at the remotely controlled disconnect-reconnect tap shown in this diagram through a coupling network 40 from the CATV distribution cable 41. The first stage A1 is an RF amplifier, preferably a solid state 30 dB gain amplifier, tuned to 73.75 MHz. The next stage, FM discriminator A2, detects the audio tones received. Tone decoder A3 is a bank of seven tone filters with inputs connected in parallel, each one tuned to one of the seven different frequencies f1 to f7. Tone decoder A3 feeds a digit gate A4 which feeds a sequence gate A5 which, in turn, feeds a voltage switch A6. When the proper sequence of tones $f1$ to $f7$ is received, voltage switch A6 produces a control voltage which causes the coaxial RF switch A7 to change state, from "off" to "on" or from "on" to "off", thus controlling the feed of TV or FM signals to the house drop from line 42. Voltage switch A6 also, when it turns the coaxial RF switch A7 from "on" to "off" sends a signal to a task identification generator 43 which sends a signal of, for example, 29.00 MHz back over a line 44 to the coupling network 40 and thence back to the head end of the CATV system.

Figure 5:
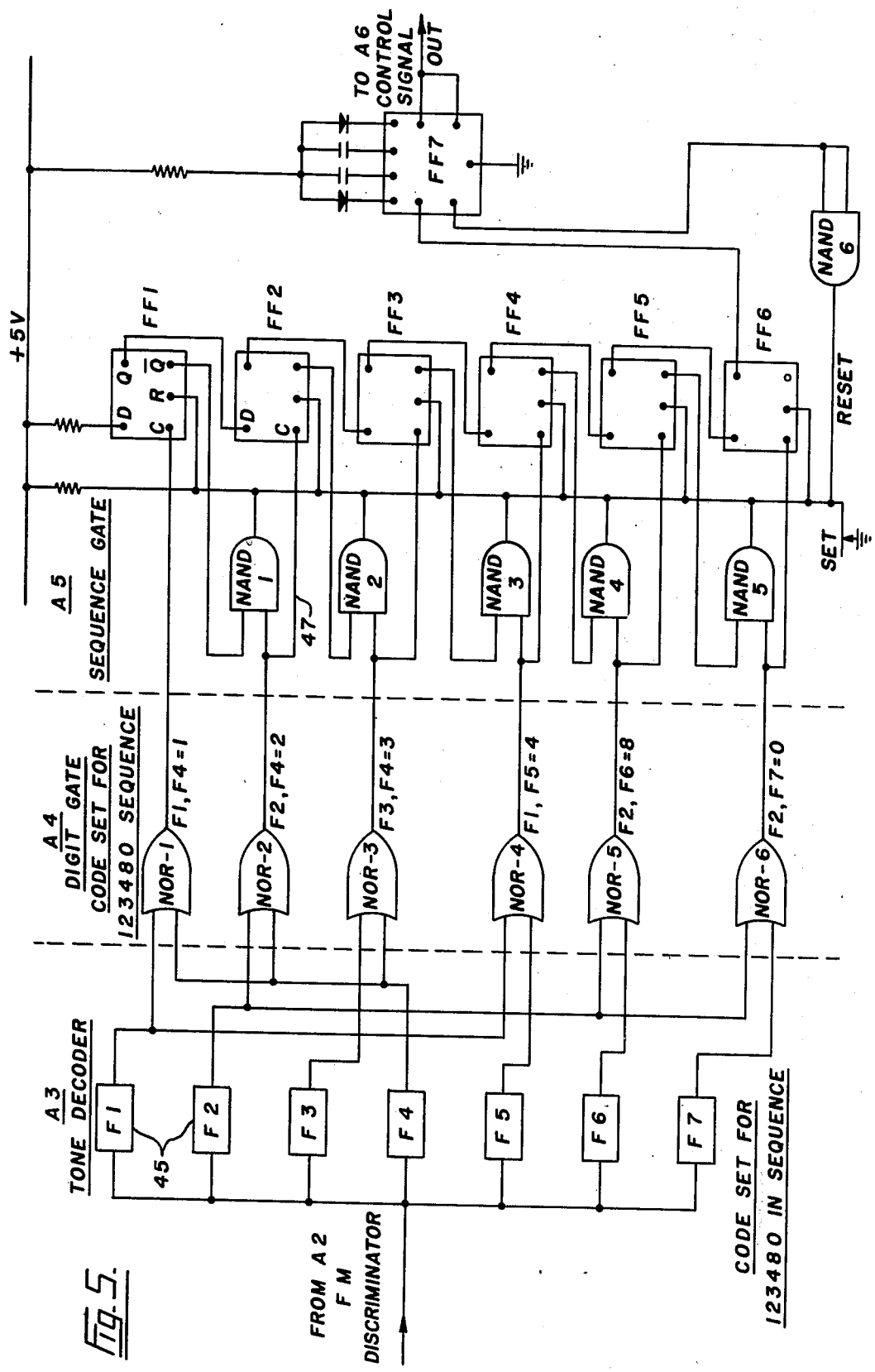
FIG. 5 is a block diagram illustrating in more detail circuits A3, A4 and A5 of FIG. 4.

Referring to FIG. 5, there is shown in more detail components A3, A4 and A5 of FIG. 4.

The tone decoder, as mentioned above, comprises a bank of seven tone filters 45 with inputs connected in parallel. When one of the tones f1 to f7 is present, the output of the associated filter F1 to F7 goes to zero.

Figure 3:
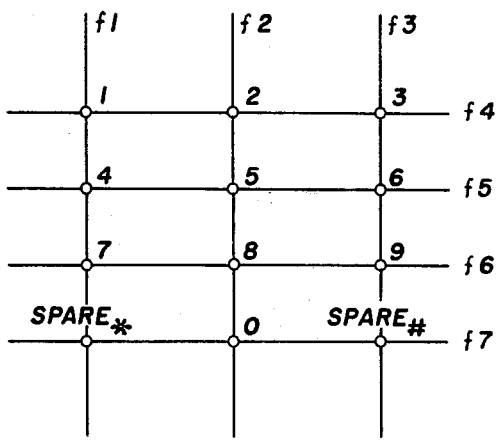
FIG. 3 is a chart illustrating how digits may be assigned to tone pairs.

The digit gate A4 comprises a group of six dual input NOR gates. These will only activate individually when both inputs simultaneously receive a "zero" from the filters in A3 to which they are connected. The actual digits in the code to which the remotely controlled disconnect-reconnect tap will respond is determined at this point by the configuration of the connections from the seven filters to the dual inputs of each NOR gate. Assume the digits are assigned as follows:

1 to $f1$ and $f4$
2 to $f2$ and $f4$
3 to $f3$ and $f4$
4 to $f1$ and $f5$
5 to $f2$ and $f5$
6 to $f3$ and $f5$
7 to $f1$ and $f6$
8 to $f2$ and $f6$
9 to $f3$ and $f6$
0 to $f2$ and $f7$
* to $f1$ and $f7$
to $f3$ and $f7$ A chart can be drawn to represent this as shown in FIG. 3.

Assume a six digit number, say 123,480. The dual inputs of the NOR gates would be connected to the filters as follows, this being the configuration of A3 and A4 in FIG. 3:

NOR 1 to f1 and f4
NOR 2 to f2 and f4
NOR 3 to f3 and f4
NOR 4 to f1 and f5
NOR 5 to f2 and f6
NOR 6 to f2 and f7

If the number was 199,990 then the connection would be:

NOR 1 and NOR 2 to f1 and f4
NOR 3 and NOR 4 to f3 and f6
NOR 5 and NOR 6 to f2 and f7

The next thing is to establish the order in which the particular remotely controlled disconnect-reconnect tap recognizes the code digits. NOR 1 output is connected to a flip flow switch FF1 in sequence gate A5. If the output from NOR 1 has been activated by correct digit then FF1 will toggle and its output will start to propagate down the chain. Thus if FF1 is toggled its "true" output Q will go high, placing an enable voltage on the terminal D of FF2. At the same time, the "not true" output Q of FF1 applies a low voltage to one input of NAND gate 1 thus disenabling it. If the NOR 2 output is readied by the next correct digit then flip flop FF2 will toggle as a result of an input over line 47 to its terminal C. The circuit will then wait for a third tone pair to ready FF3. Six tone pairs, or digits, in the right order will indicate to the next part of the circuit that the digit sequence is correct. If however, an improper sequence occurs each of the NAND gates 1 to 5 is connected in such a way that its output will go to 0 (off) after a few seconds. The sequence gate A5 will reset to its ready position to await the first correct digit of a new sequence. A correct sequence will toggle FF7, which produces a 20 millisecond duration 5 volt pulse with a dual function. The first function is to advise the ensuing circuit A6 (in FIG. 6) that the digit sequence is correct. The second function is to toggle NAND gate 6, which will reset the sequence gate A5 to the ready position for the next command.

The diodes and capacitors connected to FF7 are simply a timing network, the time constant of which determines the width of the output pulse, e.g. 20 millisecond.

Referring now to FIG. 6, voltage switch A6 simply switches alternatively +12 volts or −12 volts to operate the coaxial RF switch A7. A6 gets its command from FF7 (FIG. 5) so that therefore each time a correct digit sequence occurs the coaxial RF switch will reverse its condition from "off" if "on" or "on" if "off".

A supplementary feature of A6 provides for the "on" or "off" status of A7 to be preserved in the event of power failure to the remotely controlled disconnect-reconnect tap. This is done by the use of a relay operated mechanical switch 51 which holds its last position whether power is on or not.

The output pulse from FF7 to the A6 circuit is applied to the relay coil 50. This pulls the switch 51 to the +12 V mode. The next command from FF7, another pulse, will cause the NAND gate 52 to conduct because both inputs to it are positive in this mode. The output of NAND gate 52 is connected to the other relay coil 53 via transistor 54 which pulls the switch 51 to the −12 V mode where it stays until the next pulse.

Switching of A7 is accomplished by the voltage polarity change in a conventional diode circuit 55. The CATV input is connected to one side of the diode switch at 56, and the house drop to the other side at 57. A voltage of −12 V on the diode switch A7 will turn off the CATV signal to the house drop, and +12 V will turn it on. That is, a positive voltage applied to the junction of the two back-to-back diodes will cause them to conduct, turning on the switch, and in turn the drop. However, a negative voltage will cause the two back-to-back diodes to stop conducting while the diode in the middle will conduct to ground, causing the switch to open.

The −12 volts is also used to trigger the task identification generator A8. This comprises an RF oscillator 60, a modulating signal source 61 and a timer 62. The RF oscillator 60, which may be any conventional crystal controlled RF oscillator, can provide any frequency in the unused portion of the spectrum of a 2-way CATV system such as, for example, 29.00 MHz. The modulating signal can be an audio frequency such as 1 KHz. The timing circuit 62 is used to briefly turn on this AM transmitter for as long as it is necessary for the information to be recorded at the central office. The output of A8 is coupled back to the CATV distribution cable via line 44 and coupling network 40 where the VHF CATV signals entered the remotely controlled disconnect-reconnect tap. (See FIG. 4).

The diode, resistor and capacitor coupling A7 to A8 are used to produce a pulse when the tap is turned off. This pulse keys the timer 62 which turns on the oscillator 60 for a predetermined length of time.

It will be appreciated that various modifications may be made without departing from the spirit and scope of the invention as defined in the claims. An alternative type of logic circuitry which could be used is digital multiplexing and a binary counter. The first digit would appear at the output from the tone filter and pass through the multiplexer, if correct, causing the counter to advance to position one. This would also reprogram the multiplexer to look for the second digit of the desired sequence. If the next digit received and sampled was correct, the binary counter would advance to position two and so on. If, however, a digit appeared that was not in the sequence programmed, it would not pass through the multiplexer and, instead of advancing, the binary counter would reset to its initial condition.

What I claim as my invention is:

1. A remotely controlled disconnect-connect system for a cable television distribution system having a head end feeding a cable distribution system, the disconnect-connect system including a plurality of taps disposed at diverse locations along the cable distribution system and connected to a plurality of television receivers, said taps being remote from said television receivers, each tap comprising means for receiving and detecting a time sequence of digit representing signals forming a multi-digit identification code number, each of said digit-representing signals comprising at least one tone modulated on a carrier and sent over the cable distribution system from the head end, means solely responsive to the receipt of the particular sequence of said digit-representing signals forming a predetermined multi-digit identification code associate with said tap for developing an internal control signal, and bistable switch means to connect the cable distribution system and a subscriber's television.

2. A tap as claimed in claim 1 wherein said bistable switch means comprises a bistable relay which changes state, each time it receives said control signal, between a first and second position, said relay when in the first position toward biasing diodes in a coaxial switch whereby it is "on" and connecting said receiver to the cable distribution system, and in the second position, back-biasing the diodes whereby it is "off" and disconnecting said receiver from the cable distribution system.

3. A tap as claimed in claim 1 wherein said multi-digit identification code number comprises a multi-digit decimal number, each of said digit-representing signals corresponding to a decimal digit of said decimal number.

4. A tap as claimed in claim 3 wherein each of said digit-representing signals comprises a pair of tones modulated on a carrier and sent over the cable from the head end.

5. A tap as claimed in claim 4 wherein said tones are frequency modulated on said carrier and said means for receiving and detecting the pairs of tones comprises an R.F. amplifier having an input connected to the cable system and an output feeding a plurality of tone filters.

* * * * *

UNITED STATES PATENT OFFICE
CERTIFICATE OF CORRECTION

Patent No. 4,118,669　　　　　　　　　　Dated October 3, 1978

Inventor(s) PAUL J. FUNG

It is certified that error appears in the above-identified patent and that said Letters Patent are hereby corrected as shown below:

Column 3, line 30 delete "programme" and substitute --programmed--.

Column 3, line 43 delete "mHz" and substitute --MHz--.

Column 5, line 17 delete "flow" and substitute --flop--.

Claim 1 after the last printed word television, add --receiver responsive to said internal control signal to turn "off" if already "on" or "on" if already "off" to thereby disconnect or connect, respectively, said receiver to the cable distribution system--.

Claim 2 delete "toward" and substitute --forward--.

Signed and Sealed this

Twenty-second Day of May 1979

[SEAL]

Attest:

RUTH C. MASON
Attesting Officer

DONALD W. BANNER
Commissioner of Patents and Trademarks